Figure 1:
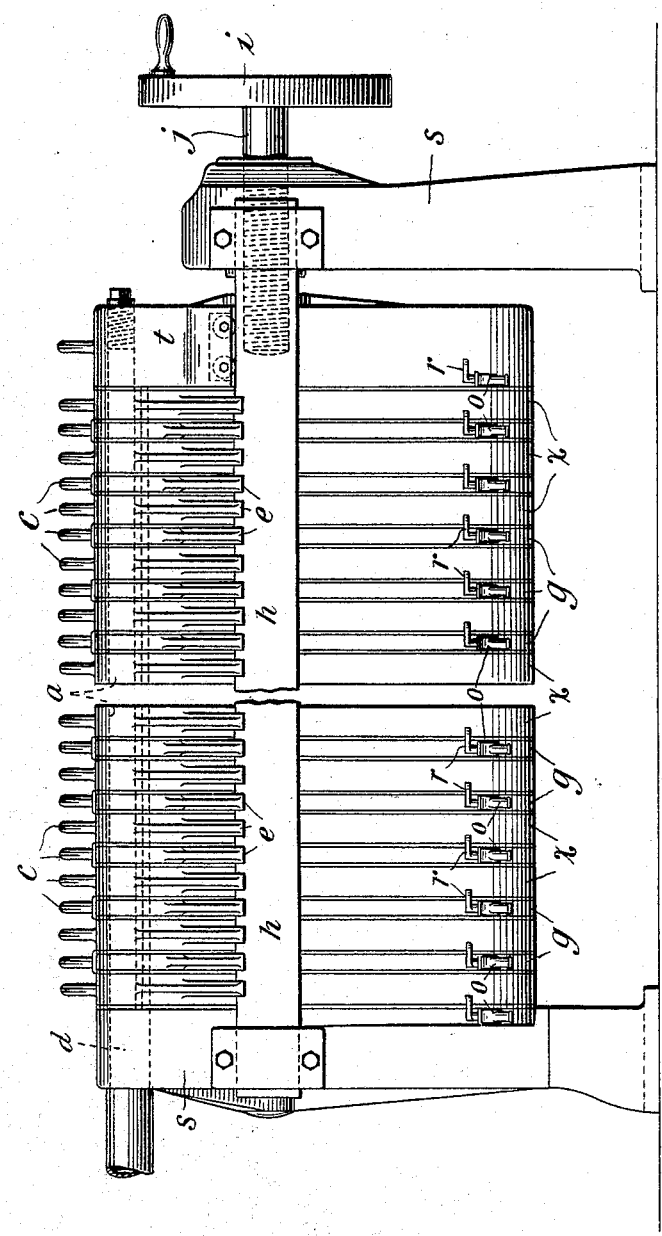

C. W. MERRILL.
FILTER PRESS.
APPLICATION FILED JULY 19, 1906. RENEWED NOV. 22, 1907.

900,185.

Patented Oct. 6, 1908.

4 SHEETS—SHEET 1.

WITNESSES:
C. E. Ashley
Charles Engel

INVENTOR
Charles W. Merrill
By his Attorney,
Millard Parker Butler

C. W. MERRILL.
FILTER PRESS.
APPLICATION FILED JULY 19, 1906. RENEWED NOV. 22, 1907.

900,185.

Patented Oct. 6, 1908.

4 SHEETS—SHEET 2.

WITNESSES:
C. E. Ashley
Charles Engel

INVENTOR
Charles W. Merrill
By his Attorney,
Willard Parker Butler

C. W. MERRILL.
FILTER PRESS.
APPLICATION FILED JULY 19, 1906. RENEWED NOV. 22, 1907.
No. 900,185.
Patented Oct. 6, 1908.
4 SHEETS—SHEET 3.
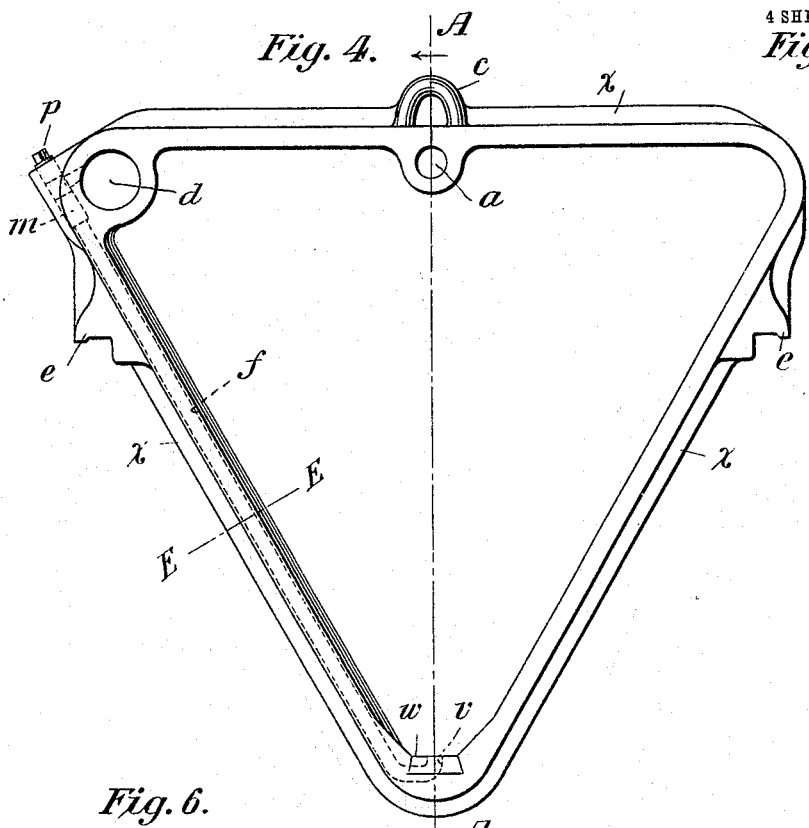
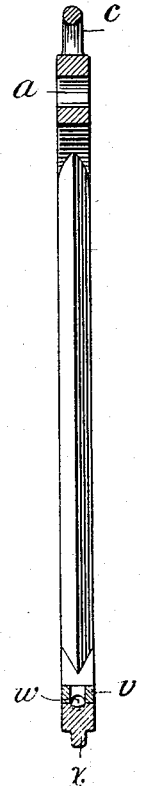
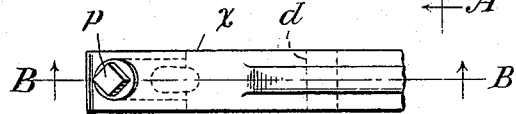
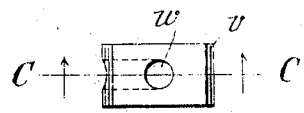
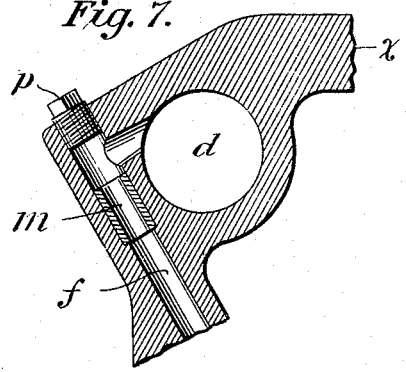
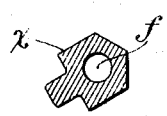
WITNESSES:
C. E. Ashley
Charles Engel
INVENTOR:
Charles W. Merrill
By his Attorney
Willard Parker Butler C. W. MERRILL.
FILTER PRESS.
APPLICATION FILED JULY 19, 1906. RENEWED NOV. 22, 1907.
900,185.
Patented Oct. 6, 1908.
4 SHEETS—SHEET 4.
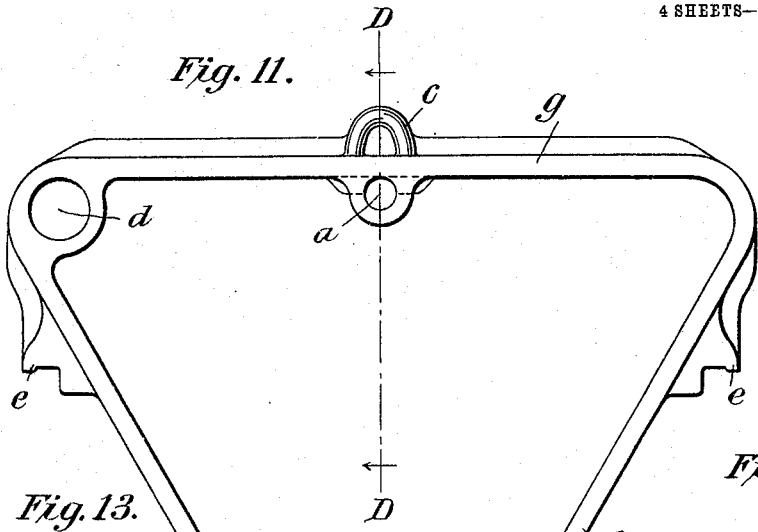
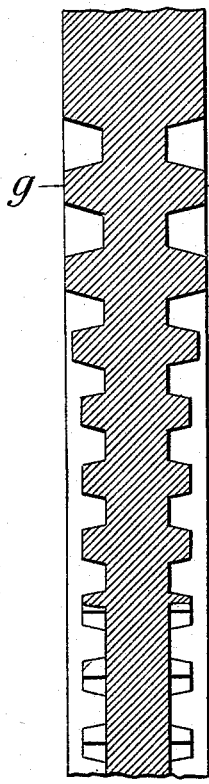
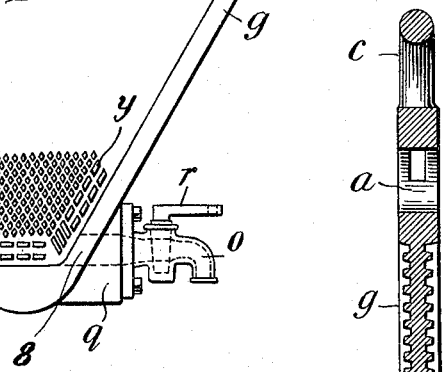
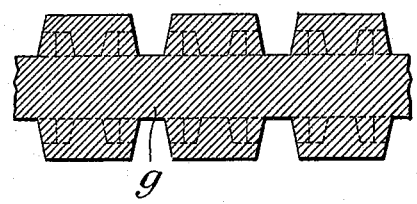
WITNESSES;
C. E. Ashley
Charles Engel
INVENTOR:
Charles W. Merrill
By his Attorney
Milano Parker Butler

UNITED STATES PATENT OFFICE.

CHARLES W. MERRILL, OF LEAD, SOUTH DAKOTA.

FILTER-PRESS.

No. 900,185.   Specification of Letters Patent.   Patented Oct. 6, 1908.

Application filed June 19, 1906, Serial No. 322,388. Renewed November 22, 1907. Serial No. 403,339.

*To all whom it may concern:*

Be it known that I, CHARLES W. MERRILL, a citizen of the United States of America, and resident of Lead, county of Lawrence, State of South Dakota, have invented a new and useful Improvement in Filter - Presses, of which the following is a specification.

My invention relates to improvements in apparatus for separating unfilterable material from a mixture of filterable and unfilterable matter, and it particularly relates to improvements in pressure filters in which the separation and treatment of such material is effected.

The principal object of my invention is to render possible an equal distribution and agitation of the unfilterable material within the containers of the filter press, whenever the same is desirable, which is particularly the case where metals are precipitated from cyanogen bearing solutions by means of a precipitant such as finely divided zinc, which has a greater affinity for cyanogen than the metals to be precipitated, or by means of a regenerating precipitant such as an alkalin sulfid, by the use of which part of the cyanogen, namely, that part in combination with such metals as will be precipitated as sulfids from a cyanogen bearing solution, is regenerated or made available for further dissolving of the metals as an alkalin cyanid. This object is accomplished by making use of a duct leading from an outlet within the container and preferably located at the bottom thereof, to a horizontal feed channel located above said outlet and preferably in an upper corner of the container. By these means I obtain all the advantage, consisting of a more efficient agitation, of a bottom feed as compared with a top feed, without the disadvantages mentioned below.

I am aware that pressure filters having a horizontal channel at the bottom with a direct outlet therefrom into the container have been used. In practice, however, it has been found that in such presses the unfilterable component containing the precipitant settles into the channel and distributes itself unevenly in the different containers. The result of this is that in some containers, usually those at the back of the press, an excess of precipitant accumulates, while others, usually those in the front of the press, retain too little to effect proper precipitation. By means of the aforesaid device, this settling out and resultant uneven distribution is obviated. Furthermore, when necessary, a removable bushing can be used to control the feed to each duct, making it possible to vary the feed to each container without opening the press. Containers of any suitable shape may be employed, but in practice a shape converging at the bottom and particularly a triangular shape so converging as shown in the drawings, is preferable.

Figure 3:
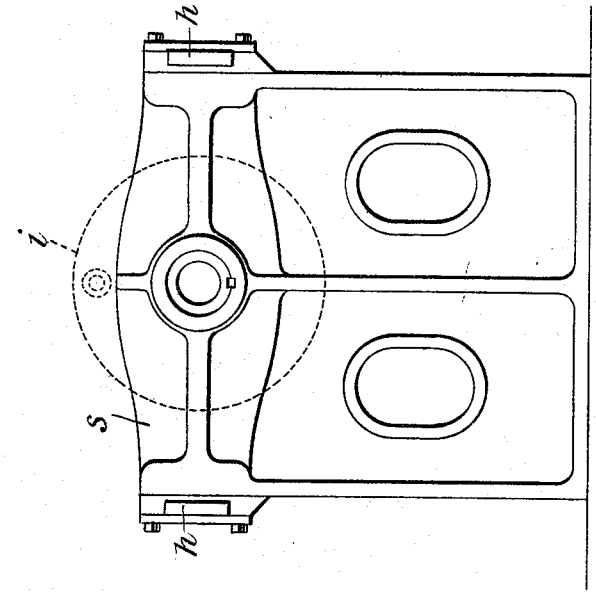
Figure 2:
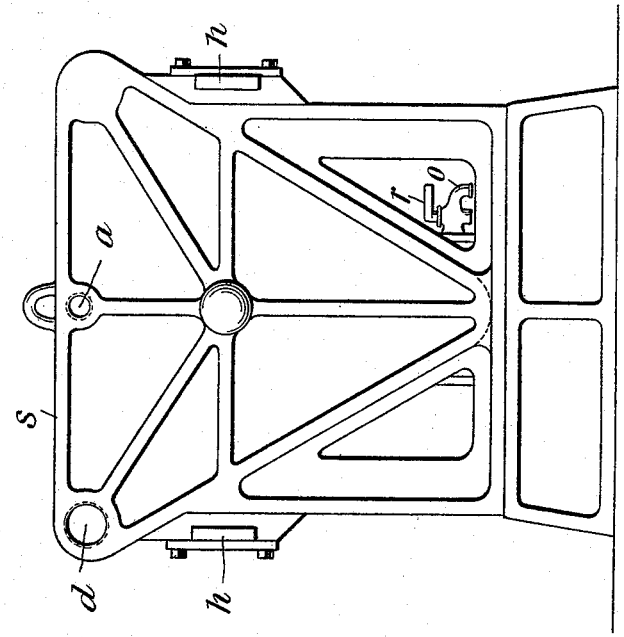

The invention will be best understood by reference to the accompanying four sheets of drawings forming a part of this specification, in which Figure 1 is an elevation of a filter press of the ordinary open delivery type although I may use with equal facility a closed delivery type. Figs. 2 and 3 show elevations of the two ends of the press respectively. Fig. 4 shows a container embodying the present invention, adapted for use in the same. Fig. 5 is a vertical section of the said container on the line A—A of Fig. 4. Fig. 6 is a plan view of the upper side of the container. Fig. 7 is a vertical section of the same portion of the container on the line B—B of Fig. 6, looking at the same in the direction of the arrows. Figs. 8 and 9 show details of the removable wedge used to form the outlet of the duct, Fig. 8 being a plan view, and Fig. 9 a section on the line C—C of Fig. 8. Fig. 10 is a vertical section of the wall of the container on the line E—E of Fig. 4. Fig. 11 is an elevation of one of the filter plates. Fig. 12 is a vertical section of one of the filter plates. Figs. 13 and 14 show the configuration of the surface of the filter plates.

Similar letters refer to similar parts throughout all the views.

In Fig. 1 of the drawings: $s$ represents the standards at either end of the filter press, $h$ the frame of the press, $j$ the screw which forces the end $t$ forward in the frame by means of the handle $i$, $x$ $x$ are the exterior frames of the series of containers, $g$ $g$ are the filter plates, $c$ the inlet pipe. All of these devices and parts are common to the ordinary form of filter press.

$e$ $e$ are the lugs upon which the containers and filter plates are supported upon the frame $h$.

$a$ is an inlet through which liquids, vapors or gases may be introduced behind the filter cloths.

$d$ is a horizontal channel located at any point above the bottom of the containers, through which the mixture of filterable and unfilterable component is introduced into the press. When a series of containers are put together in a filter press the openings a and d make a continuous opening through the press, which is closed at the ends in any convenient manner.

f are the precipitation ducts leading from the channel d into the containers closed by the plugs p; and m are bushings which may if desired be inserted in the passage f for the purpose of controlling the amount fed to each container.

8 8 are the outlets in each of the filter plates, which are provided for the effluent liquids, vapors or gases, and in the form of open delivery shown in Fig. 1 they terminate in each case in the heads q in which are placed the stop cocks o as shown in Fig. 11, controlled by the handles r which discharge into a trough of suitable dimensions. In each case d represents the inlet through which the mixture of solid, semi-solid or unfilterable material with liquid is introduced; 8 the outlets for the effluent liquid terminating in the stop cocks o; and a the inlet through which liquid vapor or gas is admitted to the filtering surface behind the cloths.

As in practice, it is sometimes found that the precipitate accumulates in the duct f, for the purpose of facilitating cleaning the same out at the bottom, a removable plug v shown in Figs. 8 and 9 is employed. This plug is provided with an opening w, which connects with the duct f, and by removing the plug access can be had to the lower portion of the duct and the same can be cleaned out in any appropriate manner.

The filter plates are provided as shown in Figs. 11, 12, 13 and 14 with projections in the form of truncated cones arranged in lines as shown in Fig. 11. In the form of filter plates shown in the earlier applications, as for example Letters Patent of the United States No. 842,484 issued to me on the 29th day of January, 1907, a groove or channel is provided on the side leading into the openings 8. This has the effect of weakening the filter plate. Hence in the present case, the roughened surface of the filter plate is provided at either side with the elongated projections y which are larger than the ordinary projections on the surface of the filter plate and form channels through which the effluent liquids, vapors or gases pass downward into the openings 8.

I claim as my invention:

1. A container for use in a pressure filter provided with a duct, leading from a feed channel located above the bottom of the container and terminating within the same adjacent to said bottom.

2. A container for use in a pressure filter provided with a duct located within its side wall, leading from a feed channel above the bottom of the container and terminating within the same adjacent to said bottom.

3. A pressure filter comprising with suitable plates a series of containers each provided with a duct, leading from a feed channel located above the bottom of the container and terminating within the container adjacent to said bottom.

4. A pressure filter comprising with suitable plates a series of containers each provided with a duct located within its side wall, leading from a feed channel above the bottom of the container and terminating within the same adjacent to said bottom.

5. A pressure filter comprising with suitable plates a series of converging containers each provided with a duct, leading from a feed channel located above the bottom of the container and terminating within the container adjacent to said bottom.

6. A pressure filter comprising with suitable plates a series of triangular containers each provided with a duct, leading from a feed channel located above the bottom of the container and terminating within the container adjacent to said bottom.

7. A pressure filter comprising with suitable plates a series of containers each provided with a duct, leading from a feed channel located above the bottom of the container, terminating within the container, prolonged to the exterior of the container, and provided with a removable closure of its continuation to the exterior.

8. A pressure filter comprising with suitable plates a series of containers each provided with a duct containing a removable bushing, leading from a feed channel to an outlet within the container.

9. A pressure filter comprising with suitable plates a series of triangular containers each provided with a duct, containing a removable bushing, leading from a feed channel located at an upper apex of said container, along the side wall thereof, to an outlet at the bottom apex of said container and intersecting said channel above the bottom line thereof, prolonged to the exterior of said container and there closed by a removable plug.

In testimony, that I claim the foregoing as my invention, I have signed my name in presence of two witnesses, this fourteenth day of June 1906.

CHARLES W. MERRILL.

Witnesses:
GEO. D. FOGLESONG,
WM. FRACKELTON.